Oct. 31, 1967     P. B. CROMMELIN, JR     3,350,076
GAS AND LIQUID CONTACT APPARATUS

Filed May 15, 1964     2 Sheets-Sheet 1

INVENTOR
PHILIP B. CROMMELIN, JR.

BY *Stowell & Stowell*

ATTORNEYS

Oct. 31, 1967  P. B. CROMMELIN, JR  3,350,076
GAS AND LIQUID CONTACT APPARATUS
Filed May 15. 1964  2 Sheets-Sheet 2
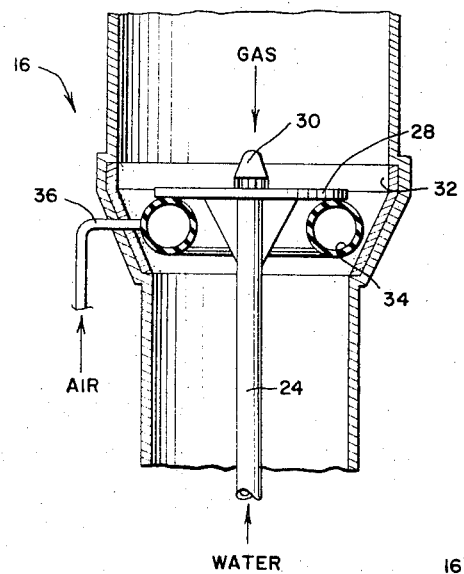
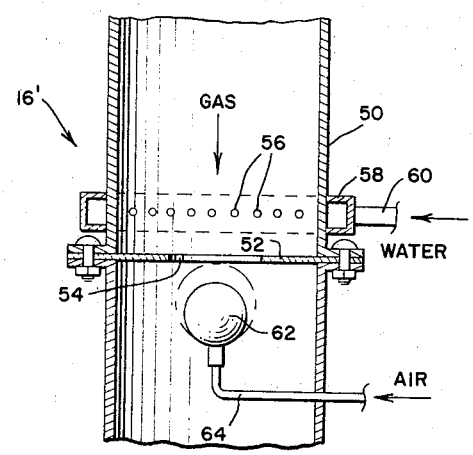
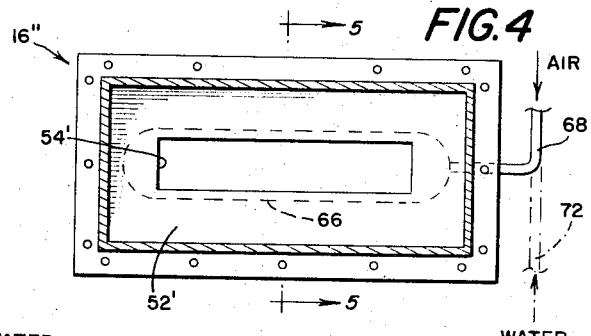
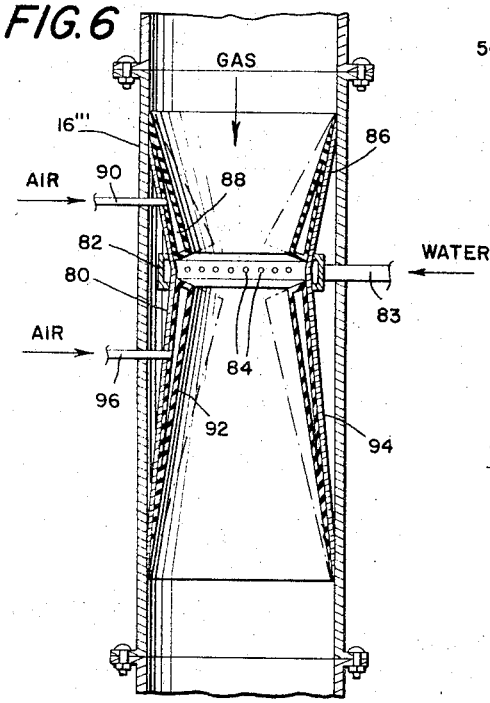
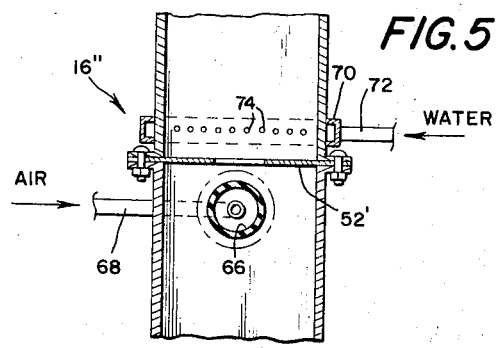
INVENTOR
PHILIP B. CROMMELIN, JR.
BY *Stowell & Stowell*
ATTORNEYS

United States Patent Office 3,350,076
Patented Oct. 31, 1967

3,350,076
GAS AND LIQUID CONTACT APPARATUS
Philip B. Crommelin, Jr., West Orange, N.J., assignor to Research-Cottrell, Inc., Bridgewater Township, N.J., a corporation of New Jersey
Filed May 15, 1964, Ser. No. 367,624
4 Claims. (Cl. 261—118)

ABSTRACT OF THE DISCLOSURE

A gas and liquid contact apparatus having a flow constricting member disposed in a gas conducting conduit and an expansible member positioned adjacent the constricting member to define therewith a variable space therebetween. The gas to be contacted flows through the conduit and liquid is introduced therein adjacent the zone of gas flow constriction.

---

This invention relates to improvements in gas and liquid contact apparatus and, in particular, to improvements in scrubbers for removing liquid soluble gases, and particulate material from gas streams.

The introduction of water or other scrubbing liquid into a turbulent airstream to provide intimate mixing of the water and the gas breaks the water up into extremely fine particles which collide and adhere to dust fume. Thereafter further collisions occur which agglomerate and enlarge the fume-water particles whereby they become large enough to be easily caught in conventional mechanical mist eliminators. Liquid scrubbers for gas streams are generally designed for rated gas flow conditions. However, in the course of normal duty a scrubber may frequently operate at gas flow conditions which are very different from the rated conditions, and scrubbers which are not designed for variations in gas flow suffer from a low collecting efficiency or high water flow rates at low gas flows and from excessive pressure drops at high gas flows.

It is a principal object of the present invention to provide means for maintaining constant pressure drop in a liquid-gas scrubber operating under conditions of variable gas flow.

A further object is to provide such a device including means for maintaining high scrubbing efficiency under varying gas flow conditions.

These and other objects and advantages are provided in a gas and liquid contact apparatus comprising gas flow conducting conduit means, gas flow constricting means positioned in a portion of the gas flow path through the conduit means, an expansible member positioned adjacent the gas flow constricting means, means for selectively expanding and contracting the expansible member to thereby increase the gas flow constriction provided by the gas flow constricting means, and means for introducing a liquid into the gas stream adjacent the zone of gas flow constriction by the gas flow constricting means.

The invention will be more particularly described with reference to the accompanying drawings wherein:

FIG. 1 is a perspective view of a flooded disc scrubber of the type disclosed in U.S. Patent 3,116,348, A. B. Walker, assigned to the owner of this invention modified to include the improvements of the present invention;

FIG. 2 is an enlarged fragmentary partial sectional view of a portion of the structures illustrated in FIG. 1;

FIG. 3 is a fragmentary partial sectional view of a modified form of the present invention;

FIG. 4 is a top plan view of another form of the present invention;

FIG. 5 is a section substantially on line 5—5 of FIG. 4; and

FIG. 6 is a fragmentary partial sectional view of another form of the present invention.

Figure 1:
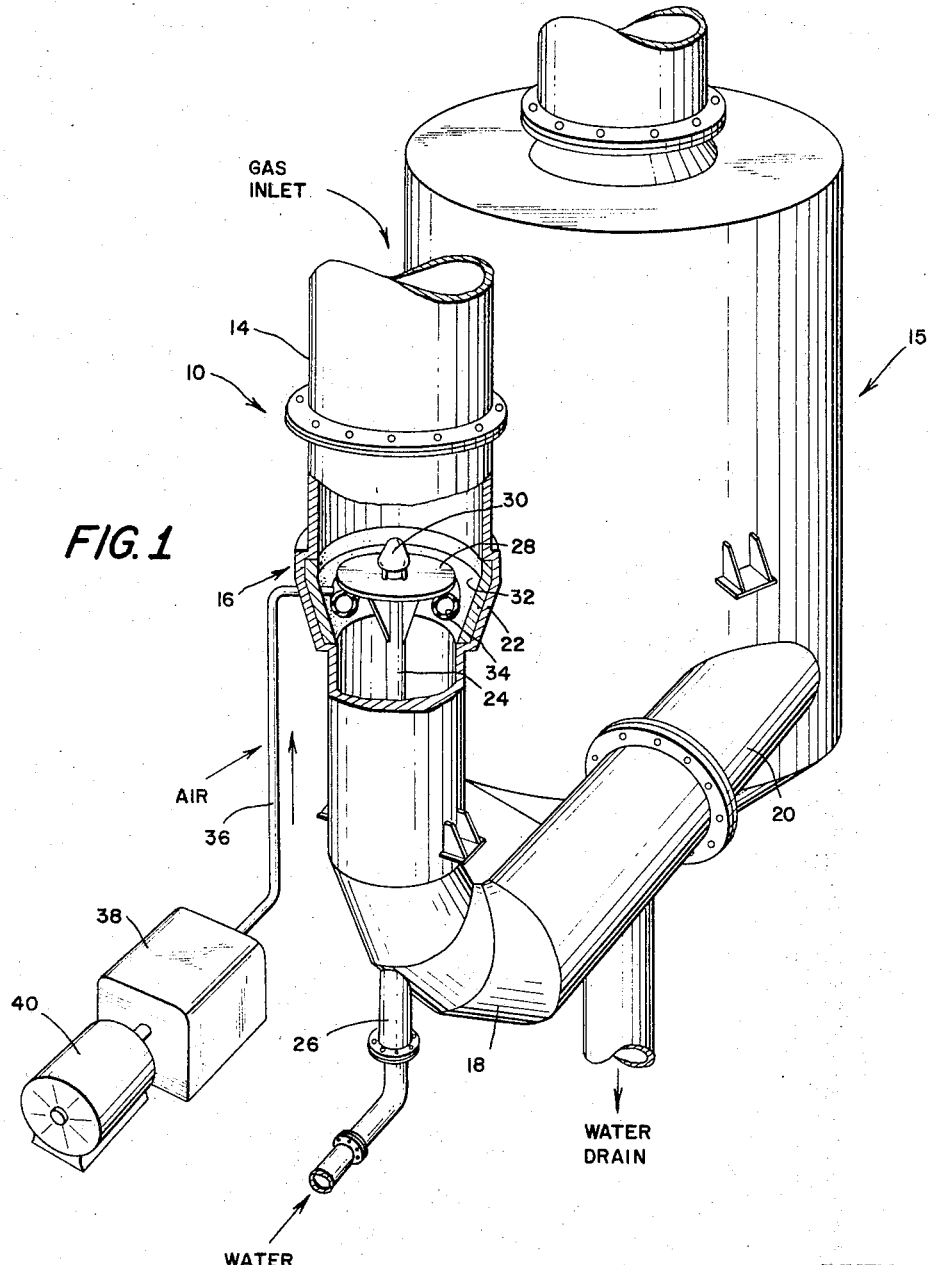

Referring to the drawings and, in particular, to FIGS. 1 and 2, 10 generally designates gas cleaning apparatus which includes a liquid scrubbing or gas treating section 16 and a water eliminator 15 of the tangential inlet cyclonic type. The gas scrubber includes a conduit 14 through which the gas stream to be treated passes to the gas treating section 16 and thence to a gas discharge conduit 18 which is connected to tangential inlet pipe 20 of the mist or water eliminator 15.

In the illustrated form of the invention, the gas treating section 16 is generally circular in cross section and the gas being treated flows in the direction of the labeled gas flow arrow. The treating section 16 includes a converging wall portion 22 having a relatively small angle of convergence in the direction of gas flow through the conduit.

The assembly also includes a duct 24 which is mounted centrally of the gas flow passage with the upstream end terminating in the converging gas flow passage. The downstream end of the duct 24 passes through a sealing bushing 26 and the duct 24 is connected to a source of gas treating liquid, not shown.

Adjacent the outlet end of the duct 24 is secured a plate or disc member 28 which member is positioned with its extended surfaces generally normal to the gas flow through the converging scrubber passage.

The duct 24 is also provided with a treating liquid deflector member generally designated 30 which deflector member may be adjustably positioned at the liquid outlet end of the duct 24 upstream of the transverse plate member 28. Adjustment of the deflector member varies the amount and nature of the gas treating fluid directed into the scrubbing passage independently of any external controls for the scrubbing liquid. Further, in the illustrated form of the invention, an anti-wear insert 32 is mounted in the area particularly subjected to abrasive action of gas borne particles.

The assembly also includes a toroidal occluder 34. The toroidal occluder or bladder is constructed of resilient material such as natural or synthetic rubbers or the like and is provided with a stem 36 which stem is connected to a source of pressure fluid which may include the pump 38 drivably connected to the electric motor 40 as illustrated in FIG. 1 of the drawings. By means of the source of pressure fluid, the bladder 34 may be inflated, thereby controlling the area existing between the outer surface thereof and the inner surface of the member 32 which defines the passage for the gas stream in passing through the gas treating section 16.

In operation of this form of the invention, a gas stream which may be issuing from a furnace is directed into the conduit 14 to flow through the treating section 16, thence to the mist eliminator 15. Water, as the cleaning fluid, is directed through the conduit 24 to issue as a spray from the outlet end 30. The gas stream and the water flow in turbulent fashion past the disc 28 to the constricted zone formed by the toroidal occluder 34 thence into the discharge pipe 18. As the volume of the gas stream to be cleaned increases, the pressure within the torous 34 is decreased thereby increasing the area of the constricted passage formed between the torous and the wall 32 of the scrubber. Conversely, as the gas stream decreases in volume, a greater pressure is directed to the toroidal occluder to thereby decrease the area of the gas flow passage adjacent the occluder. It will be appreciated by those skilled in the art that gas flow sensing means may be provided in the scrubber 10 which gas flow sensing means may be connected to automatic pressure regulating means for the toroidal occluder whereby as the volume of the air flow varies, the pressure and thence the size of the torous 34 is correspondingly varied.

The gas stream, following the constricted zone, flows to some form of mechanical, electrostatic or mechanical and electrostatic means for removing the water droplets and agglomerated particulate material.

A modified form of the present invention is illustrated in FIG. 3 wherein the gas treating section 16' of the gas treating apparatus includes a generally cylindrical gas conducting conduit 50 with a transverse plate 52 mounted therein. The transverse plate 52 is provided with a central opening 54 which is positioned downstream of cleaning fluid inlet orifices 56 which orifices communicate with an annular header 58 connected to conduit 60 which has its input end connected to a souce of gas treating liquid not shown in the drawings.

Positioned downstream of the opening 54, in the plate 52, is an inflatable sphere 62 which inflatable sphere is connected to a source of pressure fluid via conduit 64. In full lines the sphere 62 is illustrated in a low pressure condition and in broken lines in a condition of inflation. By varying the pressure within the sphere 62 of the effective opening for the passage of gas through the plate 52 is readily controlled whereby the scrubbing action in the turbulent gas flow through the orifice 54 and about the external surface of the sphere 62 is controllable through a substantial variation in volume of gas flow.

Referring to FIGS. 4 and 5, a further form of the present invention is illustrated wherein the scrubbing section 16" is quadrangular in transverse cross section and the scrubber section is provided with a rectangular plate member 52' having a rectangular opening 54' therein. Positioned above the orifice plate 52' is a header ring 70 which header ring is connected to a source of gas treating liquid via conduit 72. The header ring 70 communicates with the interior of the gas flow passage 16" through a plurality of nozzles or orifices 74 whereby the gas treating liquid is injected into the flowing gas stream from a plurality of points as hereinbefore described with reference to the form of the invention illustrated in FIG. 3.

Positioned below the rectangular opening 54' is an elongated generally cylindrically shaped inflatable member 66 which has one end connected to a conduit 68. The conduit 68 is in turn connected to a source of pressurizing fluid whereby the generally cylindrical inflatable member 66 may be inflated and deflated to control the effective size of the gas flow passage through the opening 54' in the transverse plate 52' whereby substantially uniform gas scrubbing conditions exist in the constricted passage over a substantial range of gas flow conditions thus insuring high efficiency even at low gas flows and low pressure drop at high gas flow.

Referring to FIG. 6 of the drawings, a further form of the gas scrubber of the invention is illustrated wherein the scrubber section 16''' includes a diverging-converging gas flow passage formed by Venturi throat-forming plate member 80.

A header ring 82 circles the throat-forming member 80 at the most constricted portion of the throat and the header ring 82 is connected to a source of gas treating liquid via a conduit 83.

A plurality of nozzles or orifices 84 provide for the entry of the gas treating fluid from the header 82 into the gas stream as the gas flows through the throat section of the scrubber.

In order to accommodate varying gas flow volumes without disturbing the rated pressure drop of the system and in order to maintain a high scrubbing efficiency, converging portion 86 of the throat-forming plate 80 has secured thereto a generally conical resilient bladder 88 connected to a source of inflating pressurized gas via conduit 90. A similar inflatable bladder 92 is associated with the diverging portion 94 of the throat-forming member 80. The bladder 92, like bladder 88, is connected to a source of inflating medium via conduit 96 which conduit may be connected to the same source of pressurizing medium as the conduit 90 having connection to the flow control bladder 88.

With this form of the invention, the area of the throat of the Venturi section may be effectively controlled in respect to substantial variations in gas flow. Further, by means of the separate inflatable bladder 88 and 92, turbulence in the gas stream may also be controlled within substantial limits.

The forms of the invention illustrated in FIGS. 3, 4, 5 and 6 may also be connected to automatic gas flow sensing means and automatic pressure regulators for the inflatable bladder members whereby the scrubbing efficiency of the device may be maintained nearly constant throughout the operating range of the system.

From the foregoing description of a plurality of embodiments of the present invention, it will be seen that the objects and advantages hereinbefore set forth are fully accomplished. It will also be recognized that various modifications may be made in the form of the scrubbing section and the inflatable bladder member without departing from the scope of the appended claims.

I claim:
1. A gas and liquid contact apparatus comprising gas flow conducting conduit means, a transverse plate member positioned in the gas flow conducting conduit means, an expansible member positioned to define with said transverse plate a zone of gas flow constriction therewith, means to vary the pressure within the expansible member to thereby vary the effective area of said member, and means for introducing a liquid into the gas stream adjacent the zone of gas flow constriction by said transverse plate member.

2. The invention defined in claim 1 wherein said expansible member comprises a hollow resilient toroidal occluder positioned in gas flow constricting relationship to one of the extended surfaces of the plate member.

3. The invention defined in claim 1 wherein said transverse plate is provided with a circular opening therethrough and said expansible member comprises an inflatable sphere.

4. The invention defined in claim 1 wherein said transverse plate is provided with a rectangular opening and wherein said expansible member comprises a generally cylindrical bladder.

References Cited

UNITED STATES PATENTS

| 3,009,687 | 11/1961 | Hendriks. | |
| 3,116,348 | 12/1963 | Walker. | |
| 3,182,977 | 5/1965 | Erni. | |
| 3,214,903 | 11/1965 | Cochran | 138—45 X |
| 3,216,451 | 11/1965 | Smallpeice | 138—46 X |

FOREIGN PATENTS

| 789,467 | 8/1935 | France. |
| 1,204,375 | 11/1960 | France. |
| 1,381,960 | 11/1964 | France. |
| 1,381,961 | 11/1964 | France. |
| 210,521 | 2/1924 | Great Britain. |
| 764,429 | 12/1956 | Great Britain. |

HARRY B. THORNTON, *Primary Examiner.*

E. H. RENNER, *Assistant Examiner.*